(12) United States Patent
Narayanan et al.

(10) Patent No.: US 10,641,694 B2
(45) Date of Patent: May 5, 2020

(54) MEASURING INTERFACIAL TENSION USING ELECTROSTATIC OSCILLATIONS

(71) Applicant: University of Florida Research Foundation, Inc., Gainesville, FL (US)

(72) Inventors: Ranganathan Narayanan, Gainesville, FL (US); Kevin L. Ward, Gainesville, FL (US)

(73) Assignees: UNIVERSITY OF FLORIDA RESEARCH FOUNDATION, INC., Gainesville, FL (US); NATIONAL SCIENCE FOUNDATION, Alexandria, VA (US)

( * ) Notice: Subject to any disclaimer, the term of this patent is extended or adjusted under 35 U.S.C. 154(b) by 5 days.

(21) Appl. No.: 15/953,026

(22) Filed: Apr. 13, 2018

(65) Prior Publication Data

US 2018/0231447 A1  Aug. 16, 2018

Related U.S. Application Data

(63) Continuation-in-part of application No. PCT/US2016/056956, filed on Oct. 14, 2016.

(60) Provisional application No. 62/242,233, filed on Oct. 15, 2015.

(51) Int. Cl.
*G01N 13/02* (2006.01)

(52) U.S. Cl.
CPC ................. *G01N 13/02* (2013.01)

(58) Field of Classification Search
CPC .............. G01N 13/02; G01N 13/00

USPC ....................................... 324/453
See application file for complete search history.

(56) References Cited

U.S. PATENT DOCUMENTS

| | | |
|---|---|---|
| 5,150,607 A | 9/1992 | Joseph et al. |
| 7,351,320 B2 | 4/2008 | Sams |
| 8,756,982 B2 | 6/2014 | Li et al. |
| 2013/0298649 A1 | 11/2013 | Clarke |
| 2014/0316722 A1 | 10/2014 | Szabo et al. |

OTHER PUBLICATIONS

Roberts et al "AC electrohydrodynannic instabilities in thin liquid films", J. Fluid Mech. (2009), vol. 631, pp. 255-279 (Year: 2009).*
Article Title: Pattern Formation on Liquid-Air Interfaces Due to Resonance Source: National Science Foundation (NSF), Jun. 8, 2015 URL: http://www.nsf.gov/awardsearch/showAward?AWD_ID=1514711.

(Continued)

*Primary Examiner* — Melissa J Koval
*Assistant Examiner* — Courtney G McDonnough
(74) *Attorney, Agent, or Firm* — Thomas | Horstemeyer, LLP

(57) ABSTRACT

An exemplary embodiment of an interfacial tension measurement system of the present disclosure is one in which Faraday waves or instability are formed within a vessel of fluids to be tested via electrostatic oscillations. Then, by tracking the amplitude of an applied electrical voltage having an AC harmonic load to the mixture of fluids that result in a Faraday instability, as well as the wavelength of the instability, the interfacial tension measurement system determines the interfacial tension between layers of immiscible liquids present in the vessel.

11 Claims, 4 Drawing Sheets

(56) References Cited

OTHER PUBLICATIONS

Article Title: Immiscible Interface vs. Miscible Interface in Faraday Instability Source: Academia, Jan. 5, 2014 Author(s): W. Batson, F. Zoueshtiagh, S. Amiroudine, & R. Narayanan URL: http://www.academia.edu/13863995/Immiscible_interface_vs._miscible_interface_in_Faraday_instability.

Article Title: Interfacial Tension Studies of Electrified Liquid/Liquid Interfaces: Classical Techniques for New Data Source: Office of Naval Research, Technical Report No. 045, Dec. 14, 1992, pp. 1-11 Author(s): Peter Vanysek; Northern Illinois University Department of Chemistry URL: http://oai.dtic.mil/oai/oai?verb=getRecord&metadataPrefix=html&identifier=ADA259213 (click "PDF Url").

Article Title: AC Electrohydrodynamic Instabilities in Thin Liquid Films Source: Journal of Fluid Mechanics, vol. 631, Mar. 2009, pp. 255-279 Author(s): Scott A. Roberts and Satish Kumar URL: http://journals.cambridge.org/action/displayAbstract?fromPage=online&aid=5919196&fileId=S0022112009006843.

Article Title: Faraday Instability in Electrostatically Forced Liquid-Air Systems Source: APS Physics, Bulletin of the American Physical Society Author(s): Kevin Ward, Farzam Zoueshtiagh, Satoshi Matsumoto, & Ranga Narayanan URL: http://meetings.aps.org/Meeting/DFD15/Session/L18.4.

International Search Report for PCT/US2016/056956 dated Dec. 28, 2016.

\* cited by examiner

MEASURING INTERFACIAL TENSION USING ELECTROSTATIC OSCILLATIONS

CROSS-REFERENCE TO RELATED APPLICATION

This application is a continuation in part of PCT Application No. PCT/US2016/056956, filed Oct. 14, 2016, where the PCT claims priority to U.S. provisional application entitled, "Measuring Interfacial Tension using Electrostatic Oscillations," having Ser. No. 62/242,233, filed Oct. 15, 2015, both of which are herein incorporated by reference in their entirety.

STATEMENT REGARDING FEDERALLY SPONSORED RESEARCH OR DEVELOPMENT

This invention was made with government support under grant 0968313 awarded by the National Science Foundation, grant NNX11AC16G awarded by the National Aeronautics and Space Administration, grant DGE-1315138 awarded by the National Science Foundation, grant NNH11CD70A awarded by the National Aeronautics and Space Administration and grant GA-2015-218 awarded by the Center for Advancement of Science in Space. The government has certain rights in the invention.

TECHNICAL FIELD

The present disclosure is generally related to the analysis of interfacial tension between layers of liquids.

BACKGROUND

Understanding interfacial tension is important for production in many industries, such as the chemical, cosmetic, and automobile industries. Available technologies can be used to determine interfacial tension only under certain conditions. Previously, samples with high melting points, high viscosities, or samples with similar densities could not be tested.

Devices currently used to measure interfacial tension include drop tension meters (that determine interfacial tension from the shape of a droplet), spinning drop tension meters (that determine interfacial tension from the shape of a droplet under an imposed forcing), and Wilhelmy plate tension meters (that determine interfacial tension from a force exerted on a thin wet plate), which are not easily used in extreme environments. For example, the interfacial tensions of liquid metals particularly those with high melting points, are difficult to establish using the aforementioned tension meters.

SUMMARY

Embodiments of the present disclosure provide an interfacial tension measurement system and method. Briefly described, one embodiment of the system, among others, can be implemented as follows. The system provides a vessel adapted to hold two immiscible liquids with one electrode positioned at a top of the vessel and a second electrode positioned at a bottom of the vessel. Further, a voltage source is connected between the first electrode and the second electrode, and the voltage source is configured to supply an AC harmonic load at a fixed frequency between the first and second electrodes thereby supplying an electrostatic oscillation within the liquids of the vessel from the top electrode to the bottom electrode. The system also possesses the capability to impose a constant offset voltage between the electrodes, allowing for an additional forcing counter to the direction of gravity. Also, a camera positioned above the vessel is configured to capture an image of a Faraday instability at the interface between the liquids. A controller computing device is configured to increase the amplitude of the AC harmonic load supplied by the voltage source. The controller computing device is further configured to determine a measurement of the interfacial tension between the liquids based on the amplitude of the AC harmonic load and the fixed frequency of the AC harmonic load at an onset of the Faraday instability.

The present disclosure also provides interfacial tension measurement methods. In this regard, one embodiment of such a method, among others, can be broadly summarized by the following: passing an electrostatic oscillation at a fixed frequency vertically through a vessel holding two immiscible liquids; increasing an amplitude of the electrostatic oscillation as the electrostatic oscillation passes through the liquids; recording the amplitude value of the electrostatic oscillation at an onset of a Faraday instability that is forced by the electrostatic oscillation to a data storage medium; determining a measurement of interfacial tension between the immiscible liquids based on the recorded amplitude and the fixed frequency; and outputting the measurement of the interfacial tension on a display.

Other systems, methods, features, and advantages of the present disclosure will be or become apparent to one with skill in the art upon examination of the following drawings and description. It is intended that all such additional systems, methods, features, and advantages be included within this description, be within the scope of the present disclosure, and be protected by the accompanying claims.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

The present disclosure relates to systems and methods for characterizing or measuring interfacial tension between layers of immiscible liquids through the use of electrostatic oscillation. An exemplary embodiment of an interfacial tension measurement system of the present disclosure is one in which Faraday waves or instability are formed within a container or vessel of fluids to be tested via electrostatic oscillations. Then, by tracking the amplitude of an applied electrical voltage having an AC harmonic load to the mixture of fluids that result in a Faraday instability, the present interfacial tension measurement system or tension meter determines the interfacial tension between layers of immiscible liquids present in the container. Through known relationships, the amplitude of the applied electrical voltage that results in Faraday instability for a given frequency of oscillation can be related to the interfacial tension between the layers of liquids. By proper calibration, the tension meter may provide a measurement of the interfacial tension directly in dynes per centimeter, in one embodiment.

Figure 1:
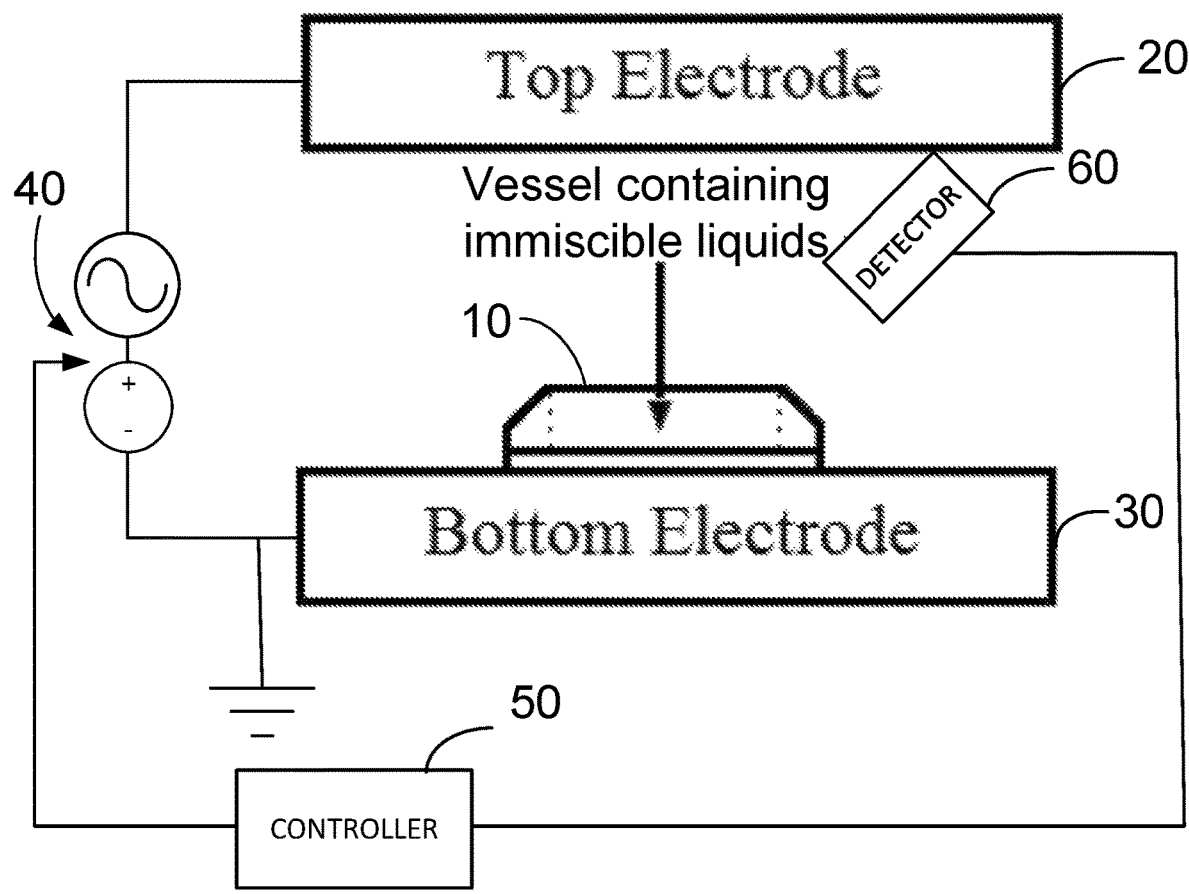
FIG. 1 is a block diagram of an exemplary interfacial tension measurement system in accordance with embodiments of the present disclosure.

According to various embodiments, a vessel 10 (e.g., dish, container, crucible, etc.) containing multiple liquids can be positioned between two electrodes 20, 30, as shown in FIG. 1. FIG. 1 shows a first electrode 20 positioned above or at a top of the vessel 10 and a second electrode 30 positioned below or at a bottom of the vessel 10 and is connected to ground. In one embodiment, the vessel 10 has a conductive bottom that is placed in contact with the second electrode 30.

Figure 2:
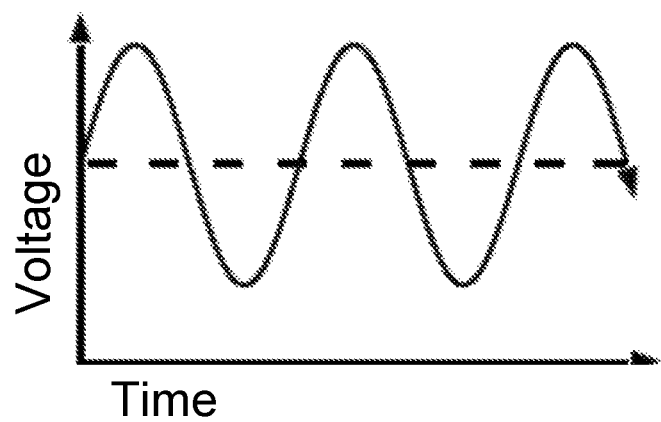
FIG. 2 is a diagram of a voltage signal comprising a constant voltage superimposed with an alternating voltage that can be applied using the interfacial tension measurement system of FIG. 1.

An AC harmonic voltage signal can be applied across the electrodes 20, 30 via a voltage source 40. In accordance with various embodiments, the voltage signal comprises a constant voltage superimposed with an alternating voltage, as represented in FIG. 2. In various embodiments, the voltage source 40 comprises a function generator and an amplifier, in which the function generator is configured to generate the voltage signal and the amplifier is configured to amplify the voltage signal in a form of an alternating voltage superimposed on a direct voltage (see FIG. 2). Accordingly, an electrostatic force of the alternating voltage superimposed on the direct voltage applied to the liquids in the vessel 10 may cause vertical oscillations of the liquids. Therefore, a controller 50 to the voltage source may adjust or increase the amplitude of the applied alternating voltage signal until the onset of Faraday standing waves, also known as Faraday instability, between the layers of liquids is detected. Accordingly, in certain implementations, a high voltage may be necessary to promote Faraday instability between two liquids.

Upon detection, the controller 50 can record to a data storage medium the amplitude value ("critical amplitude") of the alternating voltage signal that caused the interface between the liquids to begin to deflect, and then determine a measurement of the interfacial tension between the layers of liquids in the vessel 10 based on the amplitude value and the wavelength of the instability. In various embodiments, to detect the Faraday instability, a detector device 60 in the form of a high-speed camera can be used to visualize the formation of the Faraday instability (e.g., Faraday waves) and determine the wavelength of the instability from captured images. In some embodiments and environments, the detector device 60 may be adapted to provide advanced imaging techniques for high temperature measurements.

The controller 50 may be a computer suitably programmed to convert the critical amplitude to a measure of interfacial tension. Accordingly, a theoretical relationship may be derived between the critical amplitude and the interfacial tension that allows for derivation of the interfacial tension measurement from the critical amplitude, instability wavelength, and known frequency of the voltage signal. In particular, in one embodiment, a theoretical relationship is used to predict the critical amplitude needed to excite a Faraday instability within a two fluid, immiscible system forced via electrostatic oscillation. The theory requires accurate knowledge of the fluid densities, viscosities, and the interfacial tension between the fluids, as well as measurements of the geometry of the container holding the fluids. Using this theory, the interfacial tension is used as an adjustable parameter (with density, viscosity, and system geometry input as their actual values) in order to fit the prediction for the critical amplitude and prediction for the wavelength of the instability to that which is obtained during the device operation. This process is iterative, involving multiple calculations using different interfacial tensions to match the predicted critical amplitude and wavelength (at a given frequency) to that observed during operation of the device. When the correct interfacial tension is input, the critical amplitude found during device operation and that predicted during the theory will match. In addition, the pattern shape (wavelength) that is observed during the device operation will be the same as that predicted by the theory. The device is used at multiple forcing frequencies in order to generate a larger amount of data to fit by iterating the theoretical calculation, each time changing the interfacial tension. The correct interfacial tension is that which, when input to the calculation, produces theoretical critical amplitudes and wavelengths that match with those obtained during device operation at every frequency tested. Since this relationship is complex, in various embodiment, the controller 50 utilizes software and processor capabilities to process and determine the interfacial tension that matches a particular critical amplitude at a given forcing frequency.

Controller 50 may be implemented using any suitable combination of hardware/and or software, including a voltage meter for measuring voltage amplitudes and control software for controlling such voltage meter(s) or imaging device(s), among others. In some embodiments, controller 50 may include for example, a processor, memory unit, and software or operating instructions. Processor may include conventional devices, such as a Central Processing Unit (CPU), microprocessor, a "computer on a chip," a microcontroller, etc. Memory unit may include conventional devices such as Random Access Memory (RAM), Read-Only Memory (ROM), or other storage devices, and may include mass storage such as a CD-ROM, SD/Micro SD, USB storage devices, or a hard disk. Controller 50 may be included within, or may include, a computing device such a personal computer, a desktop computer, a mobile computer, a laptop computer, a server computer, or workstation. The controller 50 may also be equipped with a monitor or display or may communicate with a monitor/display for outputting relevant data or images.

In accordance with the present disclosure, an instability is produced due to a resonance of parametric forcing with a system's natural frequency. In this case, the onset of instability depends on the voltage drop across the liquid layers and the frequency of the voltage signal. In one exemplary application, the vessel 10 may contain two immiscible liquids and air or an inert gas. Using the interfacial tension measurement system, the liquids contained within the vessel 10 are electrostatically oscillated at a known frequency of the voltage signal providing an AC harmonic load (e.g., AC and DC voltage) via the electrodes 20, 30. The amplitude of the voltage drop may then be increased by the controller 50 until the interface between the liquids undulate with definite waveforms. This amplitude value is referred as the critical amplitude.

It is understood that the critical amplitude is strongly dependent on the interfacial tension between the liquids and the known/fixed frequency of the applied voltage signal. Therefore, a measurement of the interfacial tension can be derived based on the detected critical amplitude value given the known frequency value of the applied signal. In addition, the process of amplifying the voltage to determine the critical amplitude at which the interface deflects can be repeated across a range of frequencies for the voltage signal. Thus, in various embodiments, the amplitude values at which the interface between the liquids deflects across the range of frequencies can be plotted and stored by the controller 50.

In this way, the plot representing experimental or test values at which the interface deflects across a range of frequencies can be compared to other plots that represent calculated theoretical values for the critical amplitude across a frequency range. These theoretical values are dependent on the interfacial tension between the liquids, and thus various theoretical plots of critical amplitude vs. frequency can be generated with varying interfacial tensions until the theoretical and experimental plots match. As such, the experimental values obtained using the system/method described herein can be compared to theoretical values and used to validate the accurateness of the theoretical computations.

For example, if the plot for the experimental values closely matches a particular plot representing theoretical values, it can be concluded that the interface between the liquids has the same interfacial tension as the theoretical interfacial tension that corresponds to the matching plot. In this way, the theoretical interfacial tension between liquids can be measured, assessed, and adjusted for optimal fit, as needed.

Figure 3:
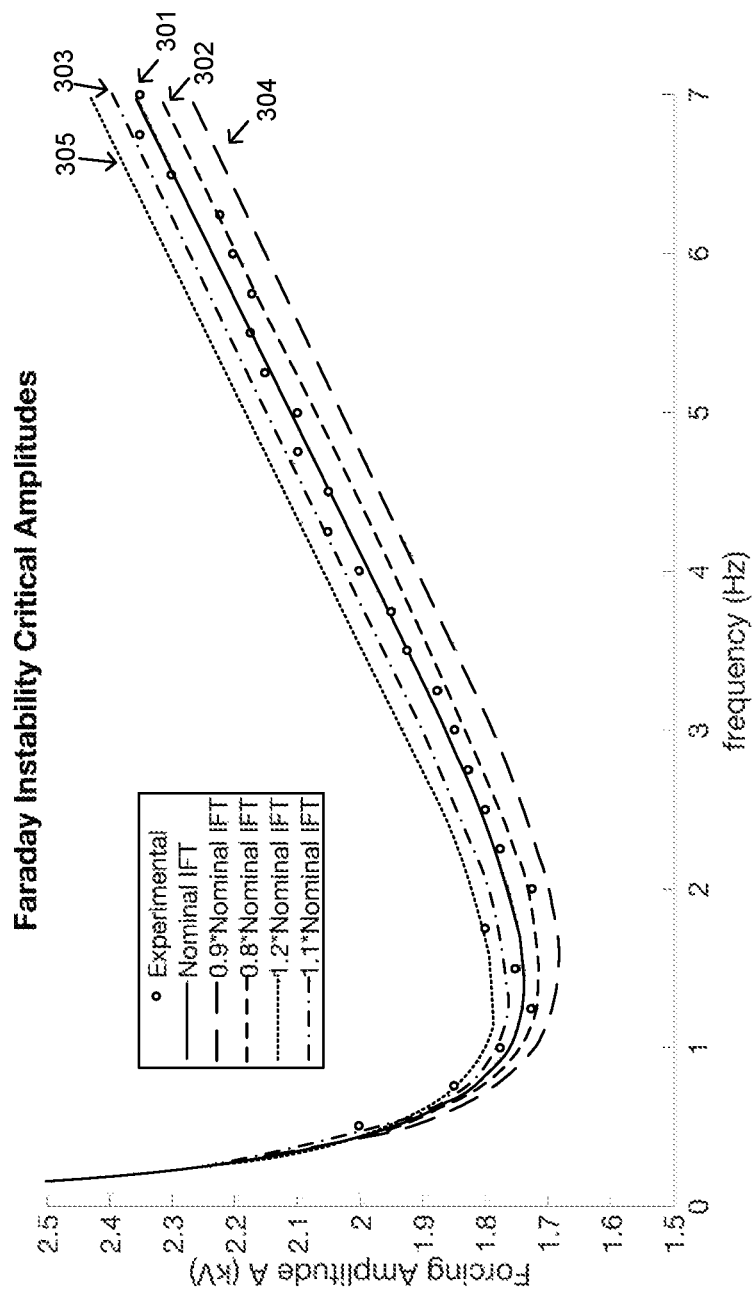
FIG. 3 is a diagram showing a plot of experimental data (circles) for the critical amplitudes required to excite the electrostatic Faraday instability at various forcing frequencies. The theoretical prediction which was calculated by using the nominal interfacial tension for the fluids used in these experiments within the theoretical model most closely matches the experimental data for the critical amplitudes in accordance with embodiments of the present disclosure.

For example, FIG. 3 shows such a plot of experimental data for the critical amplitudes required to excite the electrostatic Faraday instability in an experimental setup (having a vessel containing silicone oil and water) that closely matches the corresponding theoretical plot for the critical amplitudes to excite the electrostatic Faraday instability. Accordingly, in the figure, the experimental data of the critical amplitude of an electrostatic oscillation at an onset of a Faraday instability are obtained by using the methods of the present disclosure and are recorded across a range of frequencies for a voltage signal. These experimental data are represented by the open circles in the figure. Various theoretical plots, which are obtained by inputting various interfacial tension values into the theoretical model, of the critical amplitudes are also depicted in the figure, so that it can be determined which theoretical plot is the best fit or most closely matches the experimental data. In particular, curve 301 represents the plot of the calculated critical amplitudes which utilizes the correct value for the interfacial tension for the experimental setup (referred to as a Nominal IFT curve in the figure) and is depicted along with other curves 302-305 of the calculated critical amplitudes obtained by inputting interfacial tension values having different ranges of error with respect to the nominal IFT±10% error range (as represented by the area between the 0.9*Nominal IFT curve 302 and the 1.1*Nominal IFT curve 303) and ±20% error range (as represented by the area between the 0.8*Nominal IFT curve 304 and the 1.2*Nominal IFT curve 305). As shown, the experimental data closely match the particular theoretical plot for Nominal IFT curve 301 representing the correct interfacial tension plot, and therefore, it can be concluded that the experimental measurement for the interfacial tension between the liquids in the experimental setup that were obtained using the interfacial tension measurement systems and methods of the present disclosure are correct to a high degree.

Embodiments described herein can be applied to various applications. For example, embodiments can be used in processes that involve low interfacial tension fluids, such as in the cosmetic industry. Additionally, embodiments can indirectly be used to produce improved semiconductor crystals and other devices through the accurate knowledge of the interfacial tensions required for these processes. Furthermore, embodiments in accordance with the present disclosure can be used in extreme environments, such as high temperature chambers, while still achieving high accuracy.

As an exemplary illustration of one possible application, embodiments of the present disclosure can be used to measure an interfacial tension between liquids that are used during growth of a semiconductor crystal in a furnace atmosphere. In an exemplary crystal growth process, knowledge of interfacial tension between the melt and encapsulant is needed in order to control the growing conditions for the crystal in a furnace. Accordingly, by using the interfacial tension measurement systems and methods of the present disclosure, such interfacial tension information can be acquired. Otherwise, interface tensions between such liquids cannot be easily measured using conventional techniques. In particular, an interfacial tension measurement system/method of the present disclosure that uses electrostatic oscillations can measure interfacial tension between liquids in extreme environments with accuracy. Accordingly, samples with high melting points, high viscosities, or samples with similar densities can also be tested using embodiments of the present disclosure, thereby broadening the number of fluids that can be used and measured. Also, an exemplary embodiment of the interfacial tension measurement system/method can be used in conjunction with levitation experiments for other thermophysical properties.

Figure 4:
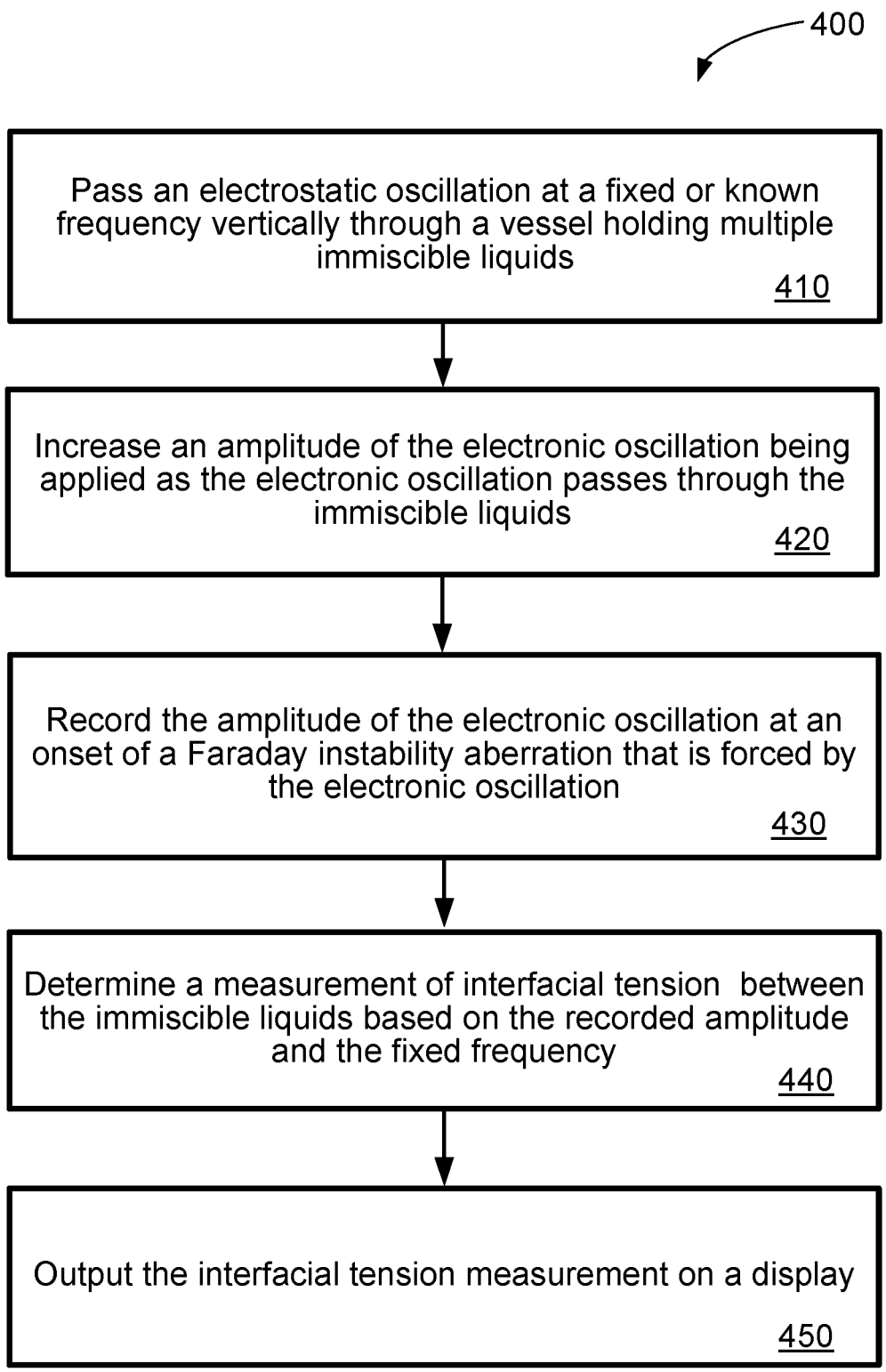
FIG. 4 is a flow chart diagram of an exemplary interfacial tension measurement method in accordance with embodiments of the present disclosure.

Next, the flow chart of FIG. 4 shows an exemplary interfacial tension measurement method in accordance with the present disclosure. The method 400 of FIG. 4 comprises passing (410) an electrostatic oscillation at a fixed or known frequency vertically through a vessel 10 holding multiple immiscible liquids. As an example, the setup of FIG. 1 may be used to apply an AC harmonic load to electrodes 20, 30 that are positioned next to the vessel 10 holding the immiscible liquids. The controller 50 may then increase (420) an amplitude of the electrostatic oscillation being applied as the electrostatic oscillation passes through the immiscible liquids. The controller 50 may also record (430) the amplitude ("critical amplitude") of the electrostatic oscillation at an onset of a Faraday instability that is forced by the electrostatic oscillation. To determine the onset of Faraday instability, a detector device 60, such as a camera, may capture images of the liquids that provide evidence of Faraday waves in the liquids being formed by the electrostatic oscillation. The detector device 60 can also determine the wavelength of the instability using the captured images. Next, a measurement of interfacial tension is determined (440) between the immiscible liquids based on the recorded amplitude, wavelength, and the fixed frequency. For example, the controller 50 may be programmed to record the critical amplitude and wavelength values in memory or storage and compute the interfacial tension measurement from the recorded critical amplitude, wavelength and the fixed frequency of the electrostatic oscillation signal. Further, the controller 50 can output (450) the interfacial tension measurement on a display.

In an exemplary embodiment, the method further includes the following actions: after determining the critical amplitude and wavelength at the fixed frequency, changing a frequency of the electrostatic oscillation to a new fixed frequency; and re-determining the critical amplitude and wavelength at the new fixed frequency; graphically plotting critical amplitude values or measurements at a plurality of fixed frequencies of the electrostatic oscillation; comparing a plot of the critical amplitude values with a plot of theoretical values for the critical amplitude, wherein the comparison is made by superimposing the plot of the critical amplitude values on the plot of theoretical values for the critical amplitude. Therefore, the interfacial tension which produces a theoretical plot which matches all the experimental points is the correct interfacial tension.

It should be clearly understood that FIG. 1 is merely schematic and that the relative positions of the elements are representative only and not necessarily at the same horizontal and vertical scales. It should also be noted that in some alternative implementations, the functions noted in the blocks may occur out of the order noted in FIG. 4. For example, two blocks shown in succession in FIG. 4 may in fact be executed substantially concurrently or the blocks may sometimes be executed in the reverse order, depending upon the functionality involved, as would be understood by those reasonably skilled in the art of the present disclosure.

It should be emphasized that the above-described embodiments of the present disclosure are merely possible examples of implementations, merely set forth for a clear understanding of the principles of the disclosure. Many variations and modifications may be made to the above-described embodiment(s) without departing substantially from the principles of the disclosure. All such modifications and variations are intended to be included herein within the scope of this disclosure and protected by the following claims.

Therefore, at least the following is claimed:

1. An interfacial tension measurement system comprising:
   a vessel adapted to hold multiple immiscible liquids;
   a first electrode positioned at a top of the vessel;
   a second electrode positioned at a bottom of the vessel;
   a voltage source connected between the first electrode and the second electrode, the voltage source configured to supply an AC harmonic load at a fixed frequency between the first and second electrodes thereby supplying an electrostatic oscillation within the immiscible liquids of the vessel from the first electrode to the bottom electrode;
   a camera positioned above the vessel and configured to capture at least one image of a Faraday instability at an interface between the immiscible liquids, wherein the image comprises a pattern shape indicating a wavelength of the Faraday instability; and
   a controller computing device configured to increase an amplitude of the AC harmonic load supplied by the voltage source, the controller computing device further configured to detect the amplitude of the AC harmonic load at an onset of the Faraday instability and determine a measurement of the interfacial tension between the immiscible liquids based on the amplitude of the AC harmonic load and the wavelength of the Faraday instability at the onset of the Faraday instability and the fixed frequency of the AC harmonic load.

2. The system of claim 1, wherein the vessel comprises a crucible positioned within a furnace.

3. The system of claim 1, wherein the controller computing device is configured to compute an interfacial tension measurement value that results in a theoretical critical amplitude value for the electrostatic oscillation that matches the amplitude of the AC harmonic load at the onset of the Faraday instability.

4. An interfacial tension measurement method comprising:
   passing an electrostatic oscillation at a fixed frequency vertically through a vessel holding multiple immiscible liquids;
   increasing an amplitude of the electrostatic oscillation as the electrostatic oscillation passes through the immiscible liquids;
   recording a critical amplitude value of the electrostatic oscillation at an onset of a Faraday instability that is forced by the electrostatic oscillation to a data storage medium;
   measuring and recording a wavelength of the Faraday instability to a data storage medium;
   determining a measurement of interfacial tension between the immiscible liquids based on the recorded critical amplitude value, wavelength, and the fixed frequency; and
   outputting the measurement of the interfacial tension on a display.

5. The method of claim 4, further comprising capturing at least one image of the Faraday instability, wherein the capture of the at least one image of the Faraday instability provides for detection of the Faraday instability.

6. The method of claim 4, further comprising after determining the critical amplitude value at the fixed frequency, changing a frequency of the electrostatic oscillation to a new fixed frequency; and re-determining a value of the critical amplitude at the new fixed frequency.

7. The method of claim 6, further comprising graphically plotting critical amplitude values at a plurality of fixed frequencies of the electrostatic oscillation.

8. The method of claim 7, further comprising comparing a plot of the critical amplitude values with at least one plot of theoretical values for the critical amplitude.

9. The method of claim 8, wherein the comparison is made by superimposing the plot of critical amplitude values on plots of theoretical values for the critical amplitude with various input interfacial tensions,
   wherein determination of the measurement of interfacial tension is made by selecting the theoretical plot which most closely matches the plot of critical amplitude values, thus determining the correct interfacial tension.

10. The method of claim 4, wherein the electrostatic oscillation is supplied by a voltage source generating an AC harmonic load that is connected to a pair of electrodes that are positioned above and below the vessel.

11. The method of claim 4, further comprising computing an interfacial tension measurement value that results in a theoretical critical amplitude value for the electrostatic oscillation that matches the critical amplitude value of the electrostatic oscillation at the onset of the Faraday instability.

* * * * *